Figure 1:
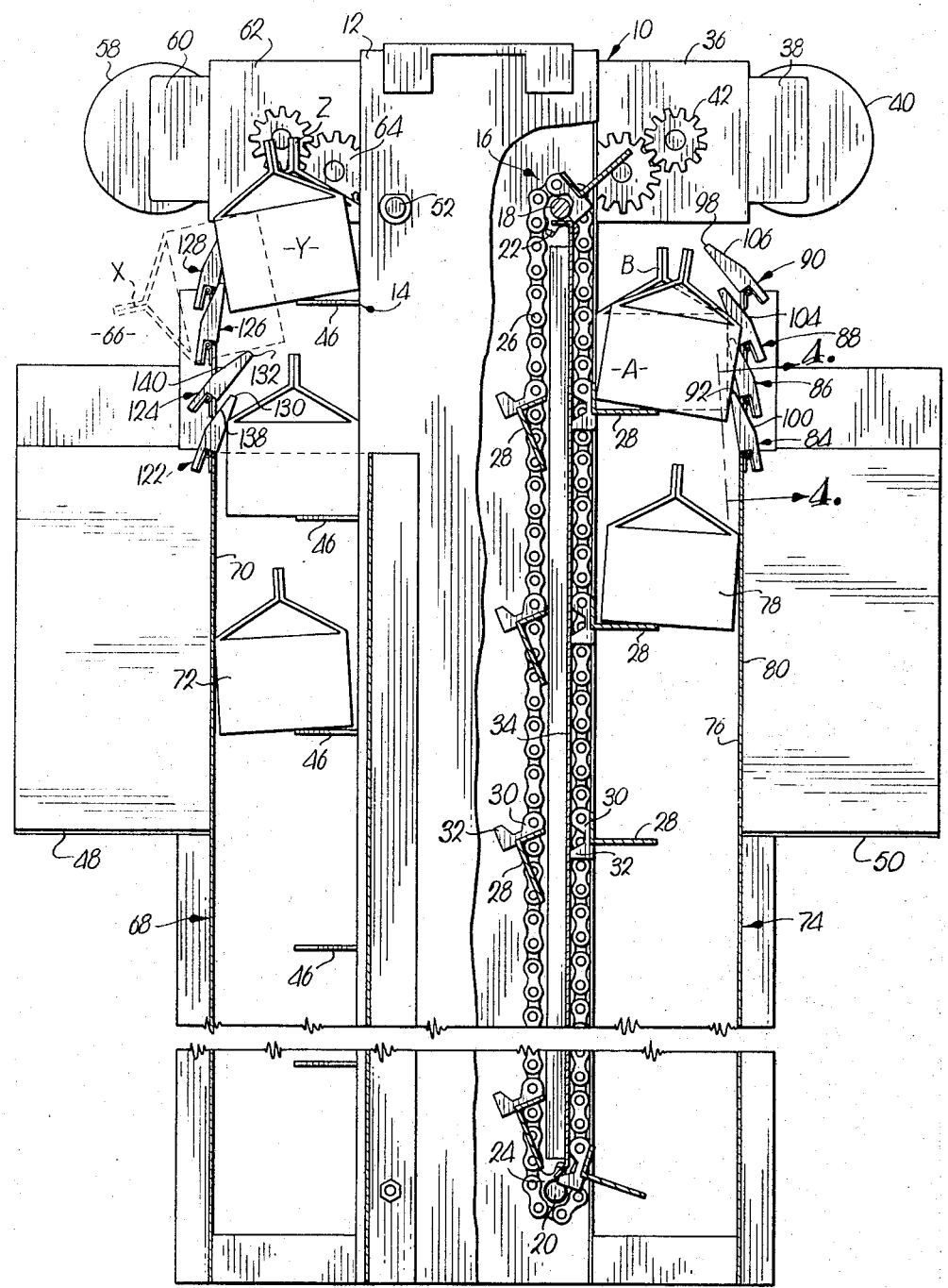

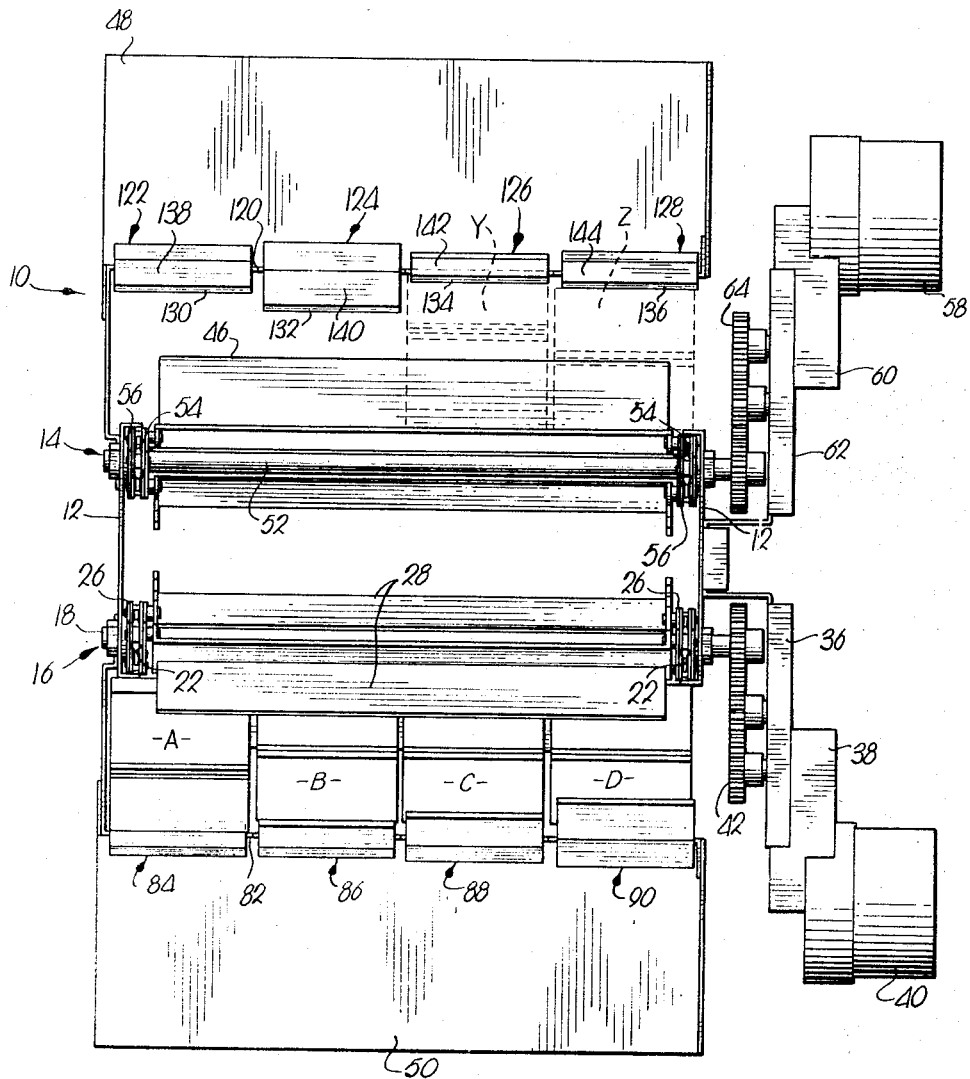

United States Patent Office 3,294,283
Patented Dec. 27, 1966

1

3,294,283
GUIDE AND POSITIVE DELIVERY MECHANISM
FOR PRODUCT DISPENSING MACHINE CONVEYOR
Le Roy D. Gore, Independence, Mo., assignor to The Vendo Company, Kansas City, Mo., a corporation of Missouri
Filed Oct. 18, 1965, Ser. No. 496,837
8 Claims. (Cl. 221—77)

This invention relates to vertical conveyor product dispensing machines wherein products are delivered to the consumer after discharge from the upper portion of the conveyor.

In order to provide dispensing machines for cafeteria lines capable of automatic replenishment, it is requisite that low profile design be utilized in order that delivery of the product to the consumer may be effected at standard counter height. A problem inherent in such design, however, is that products under storage in the product conveyor prior to dispensing must be elevated to the dispensing location, necessitating that the delivery conveyor discharge each product at or near the upper limit of its path of travel. Therefore, difficulties with positive product delivery, and guiding of the product to the counter-high access station, are presented which are not encountered in conventional low-delivery machines.

Additionally, the utilization of low profile design is also highly desirable in vending machines, both from the standpoint of aesthetic considerations and customer convenience. The relatively low, horizontal lines of a machine of this design are pleasing in appearance and, manifestly, stooping to reach the vended product is eliminated.

It is, therefore, the primary object of this invention to provide a vending or dispensing machine of low profile design capable of effecting positive delivery of its products from the upper portion of a vertical product conveyor.

As a corollary to the foregoing object, it is an important aim of the instant invention to provide means operable in conjunction with positive product delivery mechanism to guide the dispensed product from the upper portion of the product conveyor to a delivery chute communicating with a consumer access station spaced well above floor level.

A specific object of the invention is to provide an upright, product-receiving compartment for a vending or dispensing machine having a product-supporting wall which terminates at its upper extremity in a shiftable element which moves into underlying relationship to each product as the same is elevated above the element by the product conveyor whereby the upper edge or lip of the element becomes a fulcrum for the product to assure that the same will be catapulted over the wall to the delivery chute.

A further object of the instant invention is to provide a shiftable, positive delivery element as aforesaid having a guide surface which moves with said element beneath the product being dispensed to a disposition in which the surface serves to direct the gravitating product toward the delivery chute for passage to the access station.

Other objects will become apparent as the detailed description proceeds.

Figure 2:
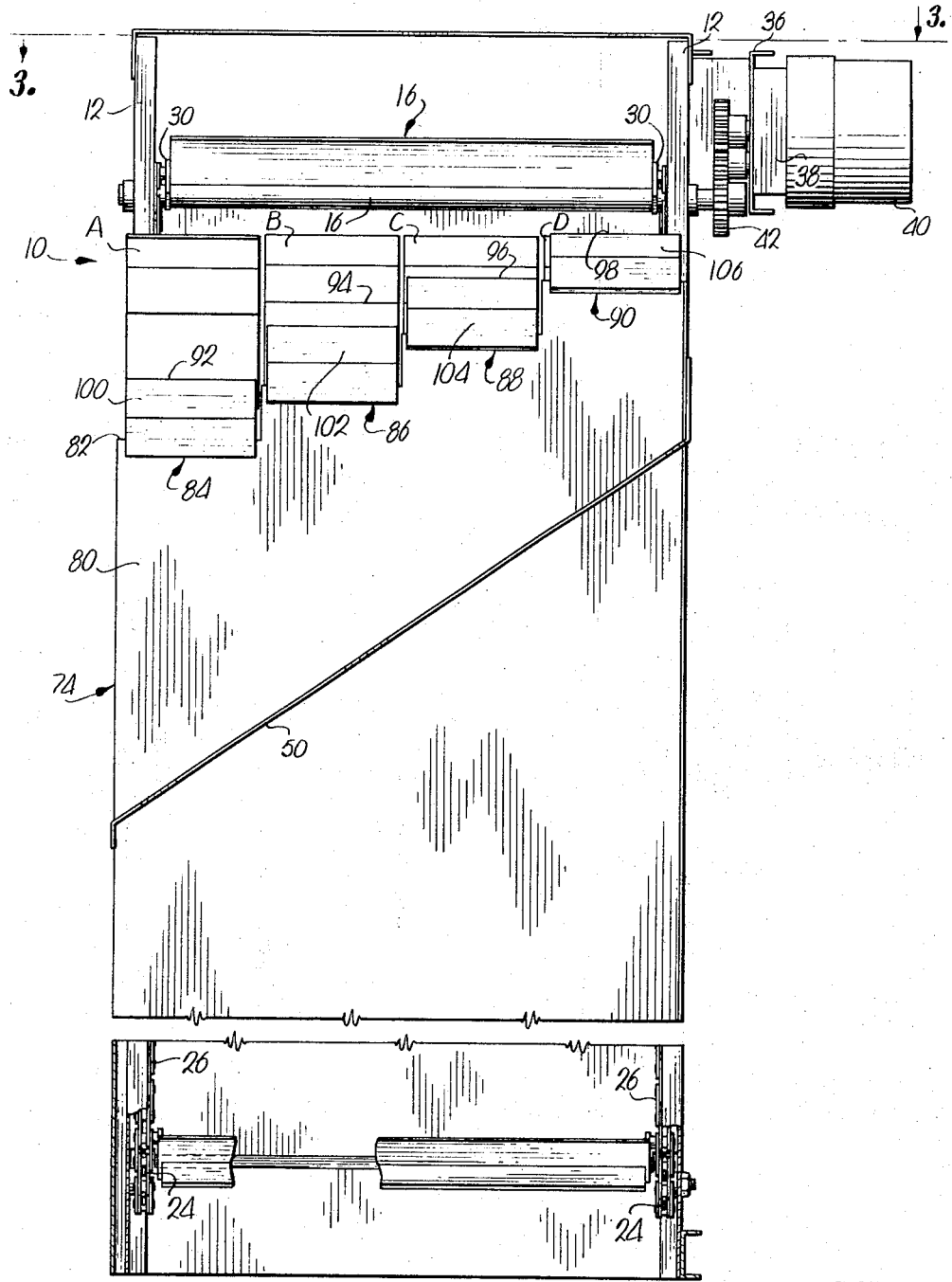

In the drawings:
FIGURE 1 is a front view of the dispensing mechanism;
FIG. 2 is a side elevational view of the mechanism shown in FIG. 1;
FIG. 3 is a horizontal sectional view taken along line 3—3 of FIG. 2, showing the mechanism in plan;

2

FIG. 4 is a detailed, fragmentary view taken along line 4—4 of FIG. 1; and
FIG. 5 is a sectional view taken along line 5—5 of FIG. 4.

The numeral 10 broadly designates conveying and delivering mechanism especially adapted for vending packaged products in the nature of cardboard containers receiving a liquid beverage such as milk. It is to be understood that mechanism 10 is mounted within the cabinet of a vending or dispensing machine and, in the case of vending operation, is operably coupled to suitable coin-operated mechanism (not shown) which controls a vend switch associated with mechanism 10. Although mechanism 10 is especially useful in the vending of milk containers, it can be recognized that various types of packaged products may be dispensed in response to the customer depositing coins of predetermined value in the coin-operated unit, or in response to direct consumer operation without the deposit of coinage when the apparatus is utilized as a product dispenser.

A pair of elongated, upright, channel-shaped plates 12 serve as a support for two vertical conveyors 14 and 16 of identical construction. Conveyor 16 comprises an upper shaft 18 and a lower shaft 20, both spanning the distance between plates 12 and journalled for rotation about horizontal axes. The upper shaft 18 carries a pair of sprockets 22 adjacent its ends and rigid therewith, while lower shaft 20 is provided with a pair of sprockets 24 adjacent its ends in vertically aligned relationship to sprockets 22 (FIGS. 1 and 2).

A pair of link chains 26 are trained around respective sprocket pairs 22, 24 and mount a plurality of elongated, horizontally extending shelves 28 disposed in vertically spaced relationship to one another (FIG. 1). Each shelf 28 is provided with a hinge bracket 30 at each end thereof which is pinned to the associated chain 26 and provided with a projection 32 which normally rides on the surface of a vertical wall 34 extending between shafts 18 and 20 (FIG. 1). It should be understood that each pair of brackets 30 is attached to a pair of horizontally aligned pins of chains 26 to permit free swinging movement of shelves 28 by gravity after the same have delivered their products and commenced downward movement, as will be explained more fully hereinafter.

An L-shaped mounting plate 36 extends from the upper end portion of the right-hand support plate 12 (as viewed in FIGS. 2 and 3), and carries a reduction drive mechanism 38 operably coupled to an electric to an electric drive motor 40. A gear train 42 interconnects the output shaft of mechanism 38 with the adjacent end of shaft 18 to thereby rotatably drive the latter upon operation of motor 40. Shaft 20 serves as an idler shaft, operation of motor 40 effecting rotation of sprockets 22 and 24 in a counterclockwise direction (as viewed in FIG. 1) so that the right-hand vertical stretch of conveyor chains 26 is shifted upwardly to carry the cartons to a delivery location generally designated 44 in FIG. 1. Each shelf 28 has four cartons resting thereon in a row, the four cartons of the uppermost loaded shelf 28 being designated A, B, C and D from left to right as seen in FIG. 2.

Conveyor 14 is identical in construction to conveyor 16 except that the shelves 46 thereof face oppositely to shelves 28. When the operation of the apparatus is discussed hereinafter, it will be appreciated that this disposition of conveyors 14 and 16 enables delivery of products to respective delivery chutes 48 and 50 located on opposite sides of mechanism 10.

Accordingly, the components of conveyor 14 include an upper shaft 52, a lower shaft (not visible in the drawings but disposed in parallelism with shaft 20 and horizontally aligned therewith), a pair of sprockets 54 mounted on shaft 52 adjacent the ends thereof, a pair of link chains 56 trained around respective sprockets 54 and corresponding lower sprockets (not shown) rigid with the lower conveyor shaft, a conveyor drive motor 58, a drive speed reduction mechanism 60 mounted on an L-shaped plate 62, and a gear train 64 coupling the output shaft of mechanism 60 with the upper conveyor shaft 52. Each shelf 46, when loaded, carries a row of four cartons thereon, the uppermost loaded shelf 46 being illustrated in FIGS. 1 and 3 as having two cartons Y and Z thereon. Additionally, to illustrate the operation of the mechanism, a third carton X is shown in broken lines in FIG. 1 at a delivery location 66, carton X being depicted as the same gravitates from the uppermost shelf 46 during dispensing thereof.

Referring specifically to FIG. 1, it may be seen that delivery chute 48 is mounted on a sidewall 68 of the mechanism, the cartons loaded on shelves 46 being disposed between the inner surface 70 of wall 68 and conveyor 14. This structure defines a vertical compartment where the cartons are maintained in storage positions prior to ultimate dispensing. A carton 72 is illustrated resting on one of the shelves 46 and leaning against surface 70 for support thereby, with its center of gravity being disposed between the edge of its shelf 46 and the supporting surface 70.

Similarly, an opposing sidewall 74 is disposed between chute 50 and conveyor 16 and defines a vertical compartment with conveyor 16 for storing the cartons associated with this conveyor prior to dispensing thereof. Wall 74 presents a vertical, internal surface 76 upon which the cartons lean for support, a carton 78 (FIG. 1) being illustrated with its bottom resting on the underlying shelf 28 and one side thereof slidably engaging surface 76. Here again, it should be noted that the center of gravity of carton 78 is disposed between the edge of its shelf 28 and surface 76.

The major expanse of sidewall 74 comprises an upright sheet metal panel 80 having an uppermost margin 82 of stair-step configuration (FIG. 2). Four delivery elements 84, 86, 88 and 90 of rectangular configuration (as viewed in FIG. 2) are swingably mounted on panel 80 at margin 82, said elements extending upwardly from margin 82 and terminating in respective horizontal edges or lips 92, 94, 96 and 98. Elements 84–90 are relatively thin in cross section and present respective outwardly facing guide surfaces 100, 102, 104 and 106.

FIGS. 4 and 5 show element 84 in detail, it being understood that all of the elements are identical in construction. A hinge pin 108 is received by a hinge barrel 110 rigid with panel 80, and a hinge barrel 112 rigid with element 84 and disposed in a longitudinal slot 114 therein. A spring 116 is coiled about hinge pin 108 with its ends bearing against barrels 110 and 112 to bias element 84 in a counterclockwise direction about pin 108 as viewed in FIGS. 1 and 5. The extent of inward movement of element 84 is limited by engagement of margin 82 with the element within slot 114.

In like manner, the major expanse of wall 68 comprises an upright sheet metal panel 118 (FIG. 1) having an upper margin (FIG. 3) of stair-step configuration and horizontally aligned with margin 82. Delivery elements 122, 124, 126 and 128 are swingably mounted on panel 118 at margin 120 for swinging movement about horizontal axes, in the same fashion as elements 84–90. Elements 122–128 are provided with horizontally extending upper edges or lips 130, 132, 134 and 136, respectively, and outwardly facing guide surfaces 138, 140, 142 and 144, respectively. Except for facing oppositely and, therefore, being biased in a clockwise direction as viewed in FIG. 1, elements 122–128 are in all respects identical to elements 84–90.

In the operation of the apparatus, the two conveyors 14 and 16 operate entirely independently and dispense products at opposite sides of the machine cabinet. It will be understood that the cabinet for the apparatus is provided with two access stations at the front thereof communicating with corresponding delivery chutes 48 and 50. Furthermore, the apparatus is actually of sufficient height to permit the access stations to be located a sufficient distance from floor level to allow removal of the products from the bottom of the delivery chutes without bending or stooping. This feature is not apparent in the drawings since, in order to conserve space and eliminate redundant illustration, horizontal break lines are utilized in the elevational views of FIGS. 1 and 2. Therefore, it is also evident that the vertical conveyors may be provided with a multiplicity of shelves in order to accommodate a large number of products in storage positions prior to dispensing.

The uppermost loaded shelf 28 of conveyor 16 is shown fully loaded with four cartons A, B, C and D. Carton A is the next product to be dispensed upon operation of conveyor drive motor 40. Subsequent operations of motor 40 will sequentially dispense products B, C and D.

In FIG. 1 it may be seen that the lip 92 of delivery element 84 is located above the bottom of carton A and that, therefore, wall 74 is still serving to support carton A to prevent toppling of the carton from its underlying shelf 28. In this regard it should be appreciated that the lips 92–98 of elements 84–90 define the upper extremity of wall 74, above which support for the cartons is no longer present. Therefore, as each carton is elevated above the associated lip, it tumbles from the underlying shelf and gravitates into the adjacent delivery chute.

The toppling action is best understood with reference to the disposition of conveyor 14. Note that the uppermost loaded shelf 46 underlies only two cartons Y and Z. Upon operation of drive motor 58, conveyor 14 will dispense product Y, and subsequent operation of motor 58 will then dispense product Z. The two other products once carried by the uppermost shelf 46 have already been dispensed. The dispensing of product X (initially located next to product Y) is illustrated in FIG. 1 by the broken lines which show that the product topples from the shelf and over lip 132 and surface 140 in its downward fall into chute 48.

It is especially noteworthy that element 124 (which initially supported carton X as it approached the delivery location 66) is shown in its most inward position with lip 132 thereof located in sufficiently closely spaced relationship to the adjacent edge of the uppermost shelf 46 to positively preclude trapping of carton X between element 124 and the uppermost shelf 46 during downward fall. Thus, as the shelves 46 of conveyor 14 rise and shift a particular carton above its associated delivery element to clear the latter, the element moves into underlying relationship to such product with the lip thereof located in sufficiently offset relationship to the center of gravity of the product to assure that the product will clear wall 118.

Referring again to element 124 by way of illustration, it should be noted that the guide surface 140 thereof is disposed in an inclined, upwardly facing position which serves to direct the tumbling carton X to delivery chute 48.

The two conveyors 14 and 16 are operated by a conventional coin-controlled mechanism as discussed hereinabove, such mechanism having a vend switch which enables operation of the drive motor of the selected conveyor in response to customer actuation of a selector switch. Motor control circuitry then effects motor operation until the corresponding sprocket bearing drive shaft shifts the shelves of the selected conveyor upwardly through a predetermined displacement which causes the dispensing of a product such as A or Y and, simultaneously, moves another product on the same shelf to a position such as illustrated by products A or Y for subsequent dispensing the next time the drive motor is actuated. The exception to this, of course, is upon dispensing of the last to be dispensed product of a particular shelf, whereupon the first product to be dispensed of the next underlying shelf is moved into the disposition illustrated by products A or Y. This continuous sequential dispensing action, as is apparent, is made possible by the stair-step configuration of margins 82 and 120 of product support panels 80 and 118 which mount the various delivery elements with the lips thereof at progressively higher elevations. When the apparatus is utilized strictly as a dispenser, of course, the conveyors are consumer operated directly by selector switches without the deposit of coinage.

As each conveyor moves its products from storage positions to the delivery location along the upwardly extending delivery path, the shelves ultimately empty one-by-one and reach the elevation of the drive shaft 18 or 52. Each empty shelf is then carried over the associated drive shaft as illustrated and swings about its pivot pins to the disposition most clearly illustrated by the elevational showing of conveyor 16 in FIG. 1. Projections 32 of hinge brackets 30 now project upwardly and the shelves 28 hang until they ultimately reach the lower limit of the conveyor travel. Then, subsequent operation of conveyor 16 brings each shelf 28 back to the horizontal, product-receiving position as illustrated in FIG. 1 where projections 32 bear against and ride on the inner surface of wall 34. Shelves 46 of conveyor 14 are carried downward and then repositioned in like fashion.

Having thus described the invention, what is claimed as new and desired to be secured by Letters Patent is:

1. A dispensing machine comprising:
    a conveyor for advancing a product upwardly along a path to be dispensed from storage disposition to a delivery location;
    structure adjacent said conveyor and extending along said path for partially supporting said product as it is advanced by the conveyor, said structure including a shiftable element having an uppermost edge presenting a lip at said delivery location defining the upper limit of said path and permitting gravitation of said product from the conveyor as the product clears the lip of the element; and
    means coupled with said element for biasing the latter in a direction to shift the same into disposition with said lip thereof in underlying relationship to said product as the latter clears the lip of the element, whereby said lip operates as a fulcrum offset with respect to the center of gravity of the products and thus effect catapulting of the product over said structure for gravitation from the conveyor.

2. The invention of claim 1,
    said conveyor having a shelf extending toward said structure when the product is in storage disposition, and into only partially underlying relationship to said product,
    said biasing means shifting said element toward said shelf as the product clears the lip thereof.

3. The invention of claim 2,
    said structure having a surface extending along said path for slidably supporting the proximal side of said product during advancement thereof along said path, whereby to prevent gravitation of the product from said shelf until the product clears said lip of the element.

4. The invention of claim 1; and
    a delivery chute below said location for conveying said product to an access station upon gravitation of the product from said conveyor,
    said element having a planar guide surface terminating in said lip,
    said biasing means shifting said element to a disposition placing said surface thereof in an upwardly facing, inclined position beneath said product after the latter clears said lip, whereby said product slides along said surface and is directed thereby into said chute.

5. A dispensing machine comprising:
    an upright compartment for receiving a series of products to be successively dispensed, and having a pair of opposed walls;
    a conveyor having a plurality of vertically spaced shelves disposed in said compartment adjacent one of said walls and extending toward the other wall,
    said shelves being adapted to partially underlie respective products with the centers of gravity of said products disposed between said shelves and said other wall, whereby the products engage said other wall for support thereby;
    means coupled with said conveyor for driving the latter to shift said shelves upwardly through said compartment to move each shelf in succession to a product delivery location above said other wall,
    said other wall including a shiftable element presenting a lip at said location defining the upper extremity of said other wall; and
    means coupled with said element and biasing the latter toward said one wall to thereby shift the lip into underlying relationship to each product as the same clears the lip upon operation of said driving means, whereby each product topples from its shell as it clears said lip and as the element shifts beneath the gravitating product to assure direction of the product over said other wall.

6. The invention of claim 5; and
    a delivery chute below said location and adjacent said other wall for conveying each product to an access station upon gravitation of each product from its shelf,
    said element having a substantially horizontally extending, uppermost edge presenting said lip, and a guide surface merging with said edge and normally facing away from said compartment,
    said other wall having means thereon mounting said element for swinging movement toward said one wall about an axis substantially in the major plane of said other wall and spaced below said lip in substantial parallelism therewith, whereby each product slides along said surface after clearing the lip and is directed by the surface into said chute.

7. The invention of claim 6,
    said biasing means, upon movement of each shelf to said location, shifting said element into said compartment to a disposition placing said surface thereof in an upwardly facing, inclined position beneath the product being dispensed.

8. A dispensing machine comprising:
    an upright, product-receiving compartment having a pair of opposed walls;
    a conveyor having a plurality of horizontal, vertically spaced shelves disposed in said compartment adjacent one of said walls and extending toward the other wall,
    each of said shelves being adapted to partially underlie a horizontal row of products with the centers of gravity of said products disposed between the underlying shelf and said other wall, whereby the products engage said other wall for support thereby,
    said other wall being provided with a plurality of shiftable elements each aligned with a corresponding vertical series of said products,
    each of said elements having a substantially horizontally extending upper lip,
    said elements being disposed with said lips terminating at successively greater elevations and defining the upper extremity of said other wall to thereby provide progressively higher product-delivery locations for each product of said horizontal rows thereof;
    means coupled with said conveyor for driving the latter to shift said shelves upwardly through said compartment to move each shelf in succession through said locations; and means coupled with said elements and biasing the latter toward said one wall to thereby shift each element into underlying relationship to a product of the corresponding vertical series as the same clears a respective lip upon operation of said driving means, whereby the products of each row are successively dispensed from the underlying shelf.

References Cited by the Examiner

UNITED STATES PATENTS

| | | | |
|---|---|---|---|
| 2,154,147 | 4/1939 | Bensemann | 221—86 |
| 2,272,750 | 2/1942 | Miller | 221—84 |
| 2,285,068 | 6/1942 | Titus | 221—113 X |
| 2,616,776 | 4/1952 | Jones | 221—77 |
| 2,644,735 | 7/1953 | James | 221—77 X |
| 2,888,165 | 5/1959 | Bookout et al. | 221—77 |
| 3,021,030 | 2/1962 | Thompson | 221—77 |

FOREIGN PATENTS 633,521    2/1962    Italy.

ROBERT B. REEVES, *Primary Examiner.*

W. SOBIN, *Assistant Examiner.*